J. M. OLSON.
SHUTTER OPERATOR FOR CAMERAS.
APPLICATION FILED MAY 10, 1915.
1,185,237.
Patented May 30, 1916.
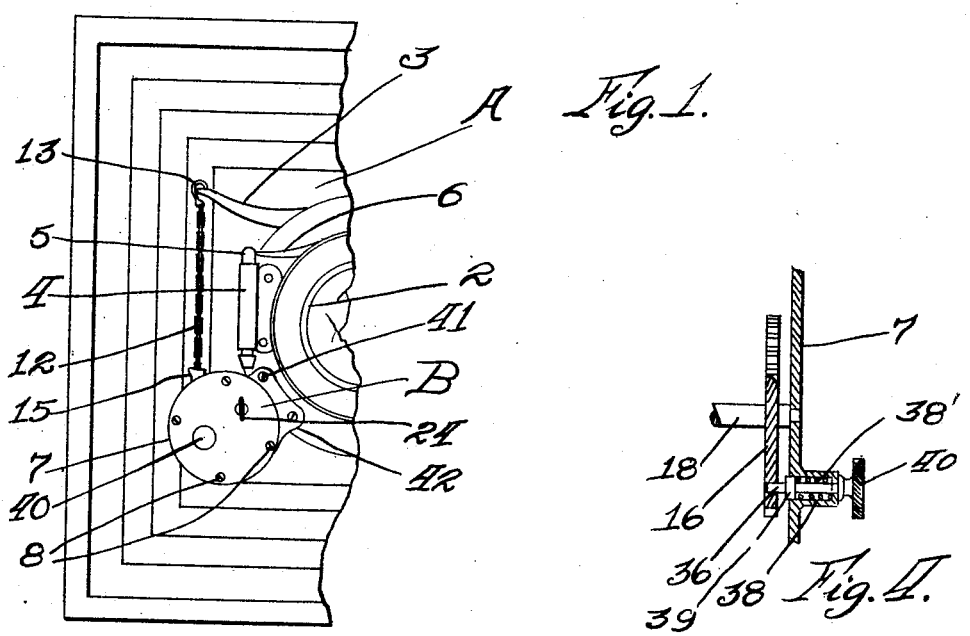
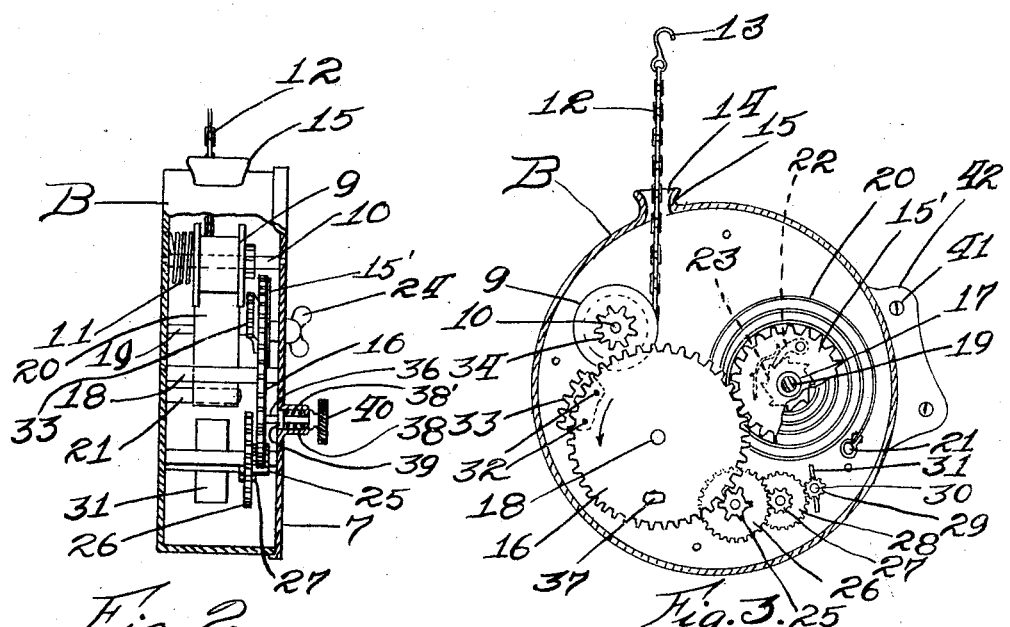
Inventor:
John Marvin Olson.
by J. S. Bradbury
Attorney.

UNITED STATES PATENT OFFICE.

JOHN MARVIN OLSON, OF ST. PAUL, MINNESOTA.

SHUTTER-OPERATOR FOR CAMERAS.

1,185,237.  Specification of Letters Patent.  Patented May 30, 1916.

Application filed May 10, 1915. Serial No. 27,057.

*To all whom it may concern:*

Be it known that I, JOHN MARVIN OLSON, a citizen of the United States, residing at St. Paul, in the county of Ramsey and State of Minnesota, have invented a new and useful Improvement in Shutter-Operators for Cameras, of which the following is a specification.

This invention relates to an improved shutter operator for cameras, whereby the shutter can be actuated automatically at any predetermined time desired by the operator, the purpose being to have a sufficient period of time elapse after the device has been placed in operation, and prior to the exposure to enable the operator to place himself in position in range of the lens before the operation of the shutter.

A further object of the invention is to provide a shutter operator of the class stated, which is encompassed within small dimensions, so as not to interfere with the ordinary operation of the camera when folded or extended.

A still further object is to provide simple and improved construction of the parts, whereby the invention can be released into operation, and which will wind the connecting element within its casing, said element being adapted for attachment to the trigger which releases the shutter into operation on the camera.

To these ends my invention, comprises the features of construction and combination of parts hereinafter more particularly described and claimed.

This invention is so constructed that the camera can be operated when standing in vertical or horizontal position or when lying upon its back or any other position.

In the accompanying drawing forming part of this specification, Figure 1 is a front elevation of a portion of a camera having my improved attachment thereon; Fig. 2 is a side elevation partly in section of my invention removed from the camera; Fig. 3 is a front elevation of the construction illustrated in Fig. 2 and Fig. 4 is a section of a detail.

In the drawing A indicates the front piece or slide of the camera carrying the usual lens tube 2.

3 designates the shutter lever such as ordinarily employed, the same being adapted to be released by air directed under pressure into the cylinder 4, motion being imparted from a piston 5 in said cylinder and to the shutter mechanism by means of a lever 6.

The parts thus far described do not constitute any of the present invention, but are substantially the same as found upon ordinary types of cameras.

My improvement is substantially contained within a small casing B very similar to and of dimensions approximating a watch case. This casing has a cover 7 secured to its body, such as by screws 8 and contained within the casing is the following mechanism: 9 indicates a spool mounted upon a shaft 10, which is freely journaled in the walls of the casing. Around the shaft 10 is a coiled winding spring 11, one end of which is attached to the casing and the other end to the spool whereby when the spool is wound against the tension of the spring and released, its revolution is reversed. Fastened to the periphery of the spool is a flexible connector 12 as shown being in the form of a chain having its free end provided with a hook 13 which is adapted to be separately coupled through the free end of the shutter lever 3. When this coupling is secured to the lever 3, the spool is wound on the shaft 10 in any suitable manner, not shown, against the tension of the spring 11, and when the shaft 10 is released, the spool automatically winds the flexible coupling upon the spool within the casing. The flexible coupling passes outwardly through a passage 14 in the casing formed by a collar 15 having a curved inner guiding surface through which the coupling slides freely. The hook 13 being larger than the passage 14 is engaged and held by the collar 15, so that the chain can be placed with its hook 13 in engagement with the shutter lever 3 at any time. The spring actuated roller 9 winds the chain within the casing when disconnected from the lever 3, thus holding the chain, so that it will not catch and be in the way when out of use. The spring 11 applies only sufficient tension to wind the spool 9 and the chain 12 upon its periphery, but is not of sufficient strength to release the lever 3 and release the shutter into operation.

Contained within the casing is suitable spring motor mechanism consisting of the usual train of gears, such as 15′ and 16 respectively carried by a sleeve 17 and a shaft 18. The sleeve 17 is journaled upon the shaft 19 to which one end of a motor spring 20 is connected, the opposite end of said motor spring being secured to the post 21 in the casing. Interposed between the shaft 19 and the gear wheel 15' is the wheel spring actuated pawl 22 and ratchet wheel 23, said ratchet wheel being secured to the shaft 19. One end of the shaft 19 extends through the cover 7 of the casing and has attached to it the usual winding key 24, by which the motor spring 20 can be wound and made to revolve the gear 15', which in turn transmits revolving motion to the gear 16. The speed of revolution of the gear 16 is regulated by a train of gears 25, 26, 27, 28 and 29, the gear 25 having its teeth intermeshing with the teeth of the gear 16 and the gear 29 being mounted upon a shaft 30 which carries a governor fan 31. By this means the gear 16 when set in motion revolves slowly at a continuous even speed until the energy of the spring 20 is expended. On the side of the gear 16 is secured by rivets 32 or other suitable means a short toothed segment 33, the teeth of which are adapted to mesh with the teeth of a pinion 34 carried by a shaft 10 which revolves the spool 9. This segment is arranged so that during every revolution of the gear 16 the pinion 34 is revolved for a short space of time, a long interval being provided during the revolution of the gear 16 when the pinion is not revolved. This period of time which elapses when the pinion 34 and spool 9 are not revolved is sufficient, so that after the device has been placed in operation and prior to the exposure, the operator is enabled to place himself in range of the lens before the segment 33 engages with the pinion 34 and causes the operation of the shutter. Immediately after the segment 33 disengages from the pinion 34 a stop pin 36 presses down automatically into an opening 37 in the side of the gear 16 and locks the gear against further movement until the pin is purposely withdrawn out of engaging position. The lock pin 36 slides laterally through the cover 7 and through a cylindrical passage 38 formed by a housing extending outwardly from the cover, said passage containing a compression spring 38' acting against the outer end wall of the housing and a shoulder 39 carried by the stop pin, said spring being adapted to urge the stop pin with its inner end either in engagement with the wheel 16 in the opening 37 or out of engagement with its inner end bearing against the side of the gear 16. A head member 40 on the outer end of the stop pin 36 can be used to withdraw the pin out of locked engagement with the gear 16 to release the motor mechanism and causing it to revolve the gear and wind the connection 12 upon the spool in the manner stated.

In operation the connection 12 is secured by the hook 13 to the shutter lever 3, the stop pin is then withdrawn from engagement with the gear 16 and the motor mechanism released into operation. As the motor mechanism operates the gear 16 revolves the spool 9 remaining stationary with the connection 12 held taut until the teeth of the segment 33 engage the teeth of the pinion 34, whereupon the chain pulls the shutter lever 3 down and releases the shutter of the camera into operation. The gear 16 continues revolving until the stop pin 36 engages it, whereupon the device ceases to operate. When it is not desired to use the invention, the chain 12 can be disconnected by unhooking the member 13 from the shutter lever 3, whereupon when the chain is released the spring 11 automatically winds the chain upon the spool 9, thus holding the chain out of the way and so that it will not catch upon any objects when not in use. The casing is adapted to be applied in convenient position to operate the shutter lever on the camera, one means of attachment being by the use of screws 41 passing through a flange 42 formed on the side of the casing, said screws being engaged to the shutter plate A on the camera.

In accordance with the patent statutes, I have described the principles of operation of my invention, together with the apparatus which I now consider to represent the best embodiment thereof, but I desire to have it understood that the construction shown is only illustrative, and that the invention can be carried out by other means and applied to uses other than those above set forth within the scope of the following claims.

Having described my invention what I claim as new and desire to protect by Letters Patent is:

1. In an attachment for cameras having the usual shutter mechanism and releasing lever, the combination of a housing, a winding spool journaled for rotation therein, a flexible element connected to and adapted to be wound upon said spool and having a free end adapted to be detachably and operably coupled to said lever, a spring for revolving said spool to wind said flexible connection, said spring having sufficient tension to wind said flexible connection when free but insufficient tension to operate said lever, spring motor mechanism having a driving part arranged to engage and revolve said spool and cause the movement of said lever to release the shutter during a portion of its operation and normally disconnected from said spool to permit the winding of said flexible connection about said spool, and a yielding stop adapted to engage a portion of said motor mechanism to stop its operation and when moved from connecting position releasing said motor mechanism into operation.

2. In an attachment for cameras having the usual shutter mechanism and releasing lever, the combination of a housing, a winding spool journaled therein, a spring for revolving said spool, means adapted for attachment to said lever and to be actuated by the revolution of said spool to operate said shutter releasing lever, revoluble mechanism adapted to operably engage said spool during a portion of its travel, and means for automatically stopping the movement of said parts.

In testimony whereof, I have signed my name to this specification, in the presence of two subscribing witnesses.

JOHN MARVIN OLSON.

Witnesses:
S. L. WASCHENBERGER,
F. G. BRADBURY.

Copies of this patent may be obtained for five cents each, by addressing the "Commissioner of Patents, Washington, D. C."